United States Patent
Meng

(10) Patent No.: US 10,391,975 B2
(45) Date of Patent: Aug. 27, 2019

(54) METHOD TO PROVIDE WARNING TO RELAY ATTACKS ON KEYLESS ENTRY AND START SYSTEMS

(71) Applicant: TOYOTA MOTOR ENGINEERING & MANUFACTURING NORTH AMERICA, INC., Erlanger, KY (US)

(72) Inventor: Ming Michael Meng, Novi, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/883,129

(22) Filed: Jan. 30, 2018

(65) Prior Publication Data

US 2019/0232917 A1 Aug. 1, 2019

(51) Int. Cl.
*B60R 25/10* (2013.01)
*B60R 25/33* (2013.01)
*B60R 25/102* (2013.01)

(52) U.S. Cl.
CPC ............ *B60R 25/102* (2013.01); *B60R 25/33* (2013.01); *B60R 2025/1016* (2013.01)

(58) Field of Classification Search
CPC ... B60R 25/24; B60R 2325/205; B60R 25/30; B60R 2325/103; B60R 25/209; B60R 25/241; G07C 2009/00865; G07C 2209/63
See application file for complete search history.

(56) References Cited

U.S. PATENT DOCUMENTS

| | | | |
|---|---|---|---|
| 8,467,770 B1 | 6/2013 | Ben Ayed | |
| 8,570,144 B2 | 10/2013 | Nowottnick | |
| 8,638,202 B2 | 1/2014 | Oesterling | |
| 9,637,086 B2 | 5/2017 | Sanji et al. | |
| 9,710,983 B2 | 7/2017 | Asmar et al. | |
| 2011/0301839 A1* | 12/2011 | Pudar | H04W 4/04 701/408 |
| 2012/0218128 A1* | 8/2012 | Tieman | G01S 1/66 340/989 |
| 2015/0291129 A1 | 10/2015 | Saito | |
| 2017/0136990 A1 | 5/2017 | Tercero | |
| 2017/0352215 A1* | 12/2017 | Maiwand | G07C 9/00896 |
| 2018/0053360 A1* | 2/2018 | Jergess | G07C 9/00007 |

* cited by examiner

*Primary Examiner* — Omeed Alizada
(74) *Attorney, Agent, or Firm* — Oblon, McClelland, Maier & Neustadt, L.L.P.

(57) ABSTRACT

A method and apparatus are presented for authenticating a vehicle equipped with a passive keyless entry and start system. The method includes sending a request for unlock or ignition start from the key fob to a vehicle's network access device (NAD), sending a first challenge signal from the NAD to the key fob, determining if the key fob is within range of the NAD, sending a second challenge signal from the NAD to the mobile device, determining if the mobile device is within range of the NAD, and sending a warning to the mobile device when the key fob or mobile device is not within range of the NAD.

14 Claims, 4 Drawing Sheets

METHOD TO PROVIDE WARNING TO RELAY ATTACKS ON KEYLESS ENTRY AND START SYSTEMS

FIELD OF THE DISCLOSURE

This specification relates generally to a warning system for automobile relay attacks for vehicles with keyless entry and start systems.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of tiling, are neither expressly or impliedly admitted as prior art against the present invention.

Passive keyless systems afford greater user convenience since they can open a vehicle door or start an ignition all while a key fob can remain in a user's pocket, backpack, purse, etc. as long as it is within range of the vehicle. Passive keyless systems can include passive keyless entry and start (PKES), passive keyless entry (PKE) without passive start, and passive keyless start (PKS) without passive entry. Moreover, physical lock and key systems are prone to security breaches via copied keys or picked locks, which a keyless entry can prevent. A system that actively protects against possible security breaches to this new keyless system, known as "relay attacks", is needed.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to various aspects of the disclosed subject matter, a relay attack warning and prevention method and apparatus are presented. The method includes sending a request for unlock or ignition start from the key fob to a vehicle's network access device (NAD), sending a first challenge signal from the NAD to the key fob, determining if the key fob is within range of the NAD, sending a second challenge signal from the NAD to the mobile device, determining if the mobile device is within range of the NAD, and sending a warning to the mobile device when the key fob or mobile device is not within range of the NAD. The apparatus includes circuitry configured to receive a request from a key fob for unlock or ignition start of the vehicle, transmit a first challenge signal to the key fob in response to the request, receive a response from the key fob based on the first challenge signal, determine if the key fob is within range of the vehicle based on a response to the first challenge signal from the key fob, transmit a second challenge signal to a mobile device, receive a response from the mobile device based on the second challenge signal, determine if the mobile device is within range of the vehicle based on a response to the second challenge signal from the mobile device, and transmit a warning to the mobile device when the key fob or the mobile device is not within range of the vehicle.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

It is to be understood that terms such as "first," "second," "proximity," "inside," and the like that may be used herein merely describe points of reference and do not necessarily limit embodiments of the present disclosure to any particular orientation or configuration.

The present disclosure has utility in preventing unauthorized automobile entry and theft in the case of a vehicle using a passive keyless entry and start (PKES) system. Traditionally, unlocking a vehicle's door, and especially starting the vehicle's ignition, has been via a physical lock and key system. The introduction of a remote access device, such as a key fob, allowed users to open their car remotely via the push of a button on the key fob. It also allowed remote ignition of the engine, but a key still needed to be inserted into the ignition to operate the vehicle. Now, myriad modern automobiles are equipped with a means for keyless entry, ignition start, and vehicle operation. These automobiles allow access without requiring a button press—the user need only be within a certain range of the vehicle with an authorized fob and the vehicle will unlock the door when an action occurs, for example touching the door handle. Additionally, most systems will allow continuous vehicle operation after the first authorization for the ignition start.

Figure 1:
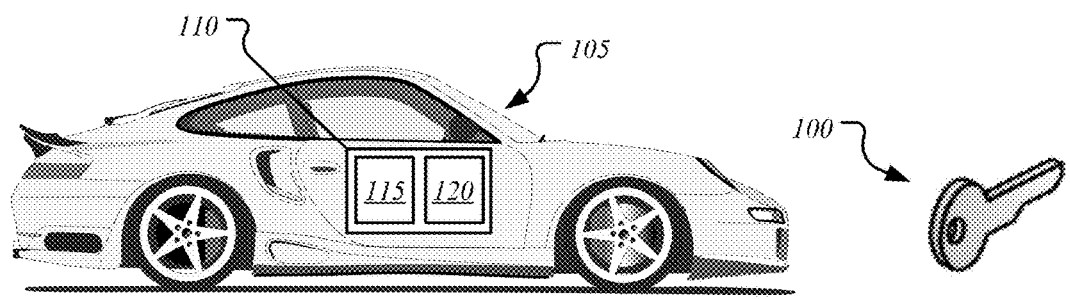
FIG. 1 is an illustration of the communication steps between a vehicle and key fob in a passive keyless entry and start system according to one or more aspects of the disclosed subject matter.
Figure 1:
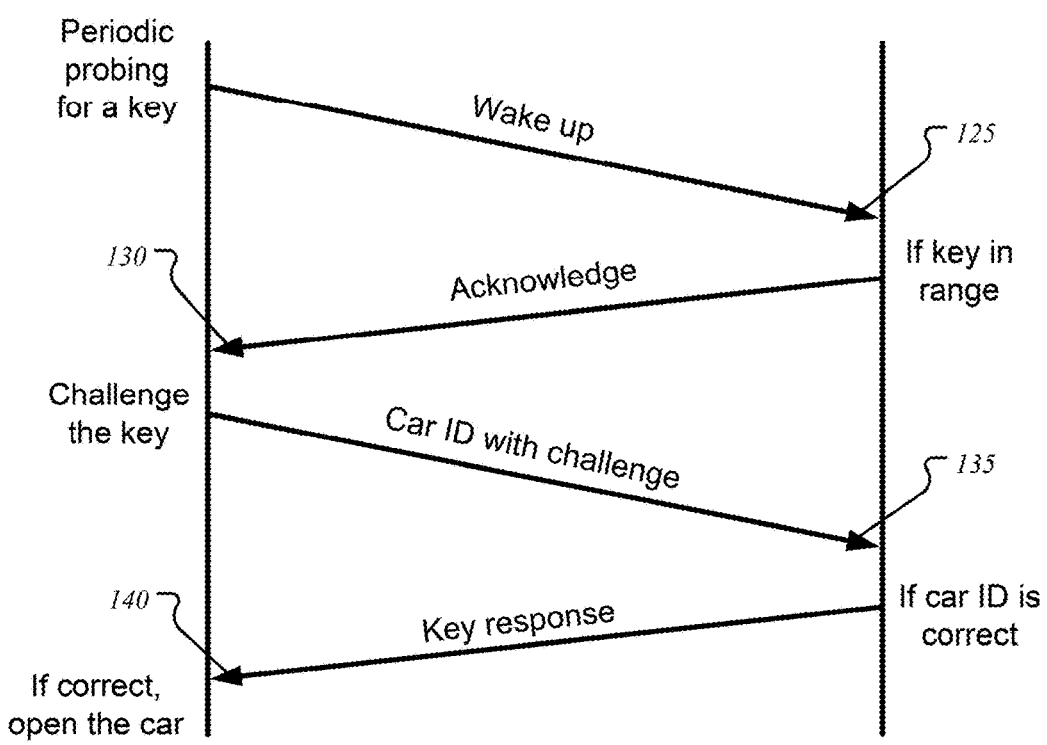

As illustrated in FIG. 1, a PKES system includes a key fob 100 and a vehicle 105 equipped with a network access device (NAD) 110 that includes a transceiver which includes a transmitter 115 and a receiver 120. The NAD 110 can also include a GPS module, processing circuitry, and storage (e.g. data storage, static memory, or random access memory). The NAD 110 can be configured to execute commands related to the vehicle 105 features, such as unlock or lock doors, raise or lower windows, open or close the trunk, start the engine or electric motor, or activate a high decibel alarm In addition to the transceiver, the NAD 110 can also be configured to communicate via a local area network (LAN), Ethernet, Wi-Fi, cellular connections, radio link, or satellite antennas, among others. The key fob 100 includes a transceiver that can perform wireless communication with the NAD 110 when within range. The key fob 100 can prompt the NAD 110 to perform certain actions, such as unlock or lock doors, raise or lower windows, open or close the trunk, start the engine or electric motor, or activate a high decibel alarm. The key fob 100 can be a portable device that is integrated into a physical key, attached to a physical key, or act as a single device without the need for a physical key. The vehicle 105 as illustrated in FIG. 1 resembles a 2-seat coupe, but can also include other types of vehicles that can house a NAD 110, such as a 4-door sedan, a hatch-back sedan, a sport utility vehicle, a pick-up truck, a van, a 2-wheel motorcycle or scooter, a 3-wheel motorcycle or scooter, a semi-trailer truck, an aircraft, or a marine vehicle.

The method by which a PKES system operates first begins with the vehicle 105 periodically probing for the key fob 100 using short beacons via the NAD 110, as indicated by a first arrow 125. If the key fob 100 is within range, an acknowledgement signal is sent from the key fob 100 back to the NAD 110, as indicated by a second arrow 130. Upon receipt of the acknowledgement, the NAD 110 challenges the key fob 100 by initiating a challenge-response protocol between the key fob 100 and the NAD 110. As indicated by a third arrow 135, the NAD 110 sends a vehicle ID with a challenge to the key fob 100. If the car ID corresponding to the key fob 100 is correct, the key fob 100 sends a reply to the challenge and an action command back to the NAD 110, as indicated by a fourth arrow 140. If the vehicle 105 determines the reply to the challenge is satisfactory, the action command can prompt the vehicle 105 to perform a desired action, for example unlocking the door. In this system, a user does not need to insert a physical key or press a button in order to unlock the vehicle 105.

Moreover, in a PKES system, if the key fob 100 is within a certain range of the vehicle 105, for example inside the vehicle 105, it can also allow the user to start the vehicle 105 ignition without requiring a physical key. A user can then operate the vehicle 105 after starting the engine without needing to insert a physical key. In both cases, the key fob 100 can remain in the user's pocket, bag, purse, etc. and need only be within a certain range to execute the unlocking or ignition procedure (and drive away), and thus increases overall user convenience.

However, while such a system is more convenient, its use of wireless signals during authentication makes it susceptible to a "relay attack" wherein access to the vehicle is obtained by relaying signals from one authorized device to another authorized device, such as the key fob 100 to the NAD 110, using at least one unauthorized device. This can result in easier theft of the vehicle 105, for example when the authorized devices are not actually within range of one another and the victim cannot see the vehicle 105 or will not discover it has been stolen for an extended period of time.

Figure 2:
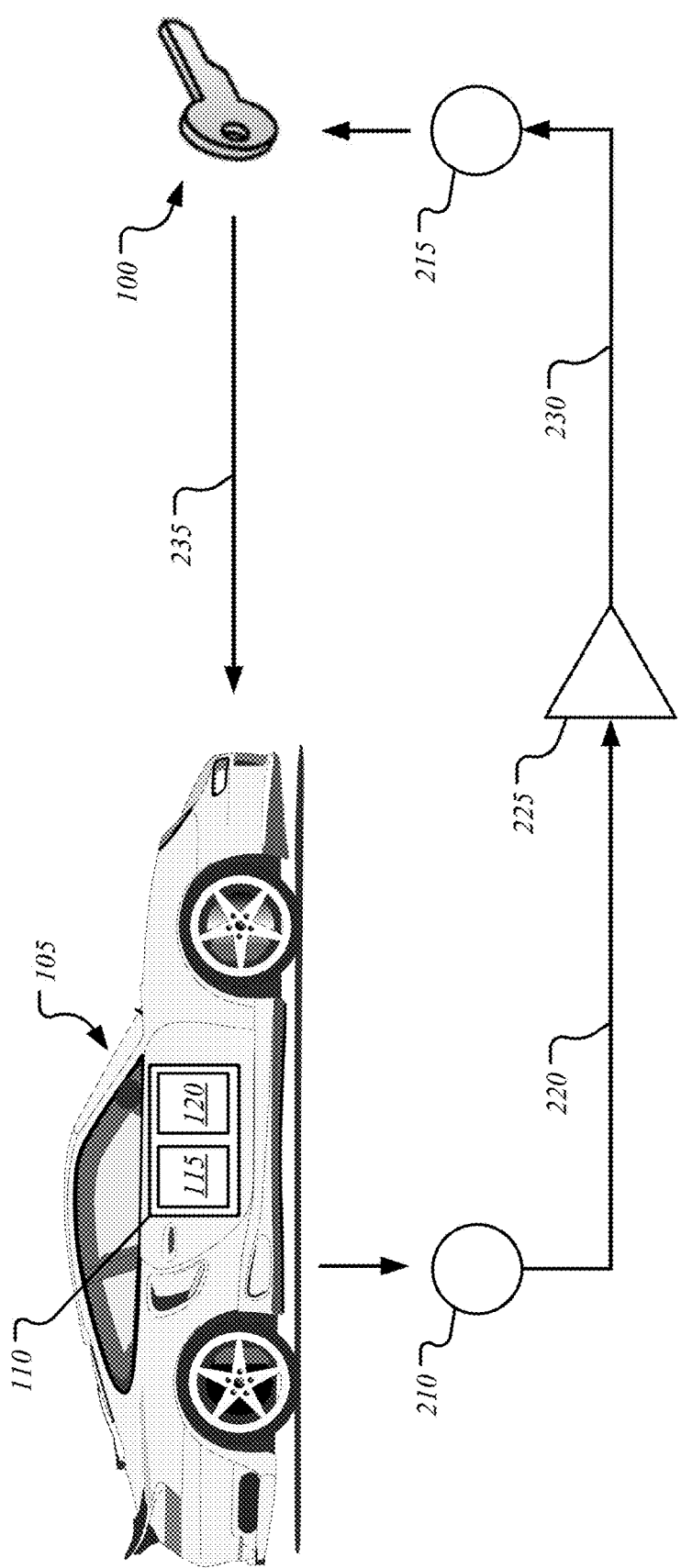
FIG. 2 is an illustration of a relay attack on a passive keyless entry and start system using a cable with two antennas according to one or more aspects of the disclosed subject matter.

One relay attack method, commonly called the "over-cable" attack, can be performed by using two antennas connected by a cable. As illustrated in FIG. 2, a first antenna 210 is placed in proximity of the NAD 110 and a second antenna 215 is placed in proximity of the key fob 100. For example, the victim can park in a public parking garage and the second antenna can be hidden where a victim commonly frequents, such as a pay station. The first antenna 210 and second antenna 215 can be connected by a first cable segment 220 and a second cable 230, both of which can be separated by an optional amplifier 225. When the first antenna 210 is placed near the NAD 110 and a request is sent for an action to occur, for example unlocking the door, the first antenna 210 captures the NAD 110 signal as a local magnetic field (low frequency signal). By induction, this creates an alternating signal at the output of the first antenna 210. This signal is then transmitted over the first and second cable segments 220, 230 and reaches the second antenna 215. The signal can also pass through the optional amplifier 225. Upon reaching the second antenna 215, it generates a magnetic field in the proximity of the second antenna 215 and communicates with the key fob 100. This can occur, for example, while the victim is obtaining a parking ticket at the pay station in the garage. The key fob 100 can then demodulate this signal and initiate the unlocking and ignition protocols. The key fob 100 can respond using an ultra-high frequency signal, as indicated by arrow 235, that can reach the NAD 110 even at a great distance, for example 50 meters away where the victim cannot see the vehicle 105. The vehicle 105 will unlock once the signal is received and grant access to the attacker.

A more common relay attack method can be performed without cables. This method requires two attackers, wherein one attacker can be equipped with a wireless attack device capable of receiving a signal from the key fob 100 while another attacker can be equipped with a wireless attack device capable of receiving a signal from the NAD 110. The attacker near the vehicle 105 can prompt the NAD 110 to send out a wireless signal, for example by initiating an unlock procedure via touching the door handle, and use the first attack device to receive and relay the transmitted signal from the NAD 110 to the attacker near the victim. The attacker near the victim receives the signal on the second attack device and relays the signal to the key fob 100. The key fob 100 does not realize the message has been relayed through the attack devices and the unlock protocol is initiated. The key fob 100, unable to distinguish whether the signal is from the first attack device or the NAD 110, believes the signal to be authentic and replies with the unlock command. The unlock command is received by the second attack device and relayed to the first attack device. The first attack device receives the response and replicates a wireless signal compatible with the NAD 110. The NAD 110, which cannot distinguish whether the signal is from the second attack device or the key fob 100, believes the signal to be authentic and executes the unlock command. A subsequent attack can be performed where the ignition protocol is initiated in the same manner when the attacker enters the vehicle with the first attack device. The attacker can prompt the vehicle to send out another wireless signal, for example by initiating an ignition start procedure via depressing the brake pedal and pushing a start button, which will then be relayed to the second attack device. Once the signal from the key fob 100 returns, the engine will start and the attacker can drive away with the vehicle 105.

Figure 3:
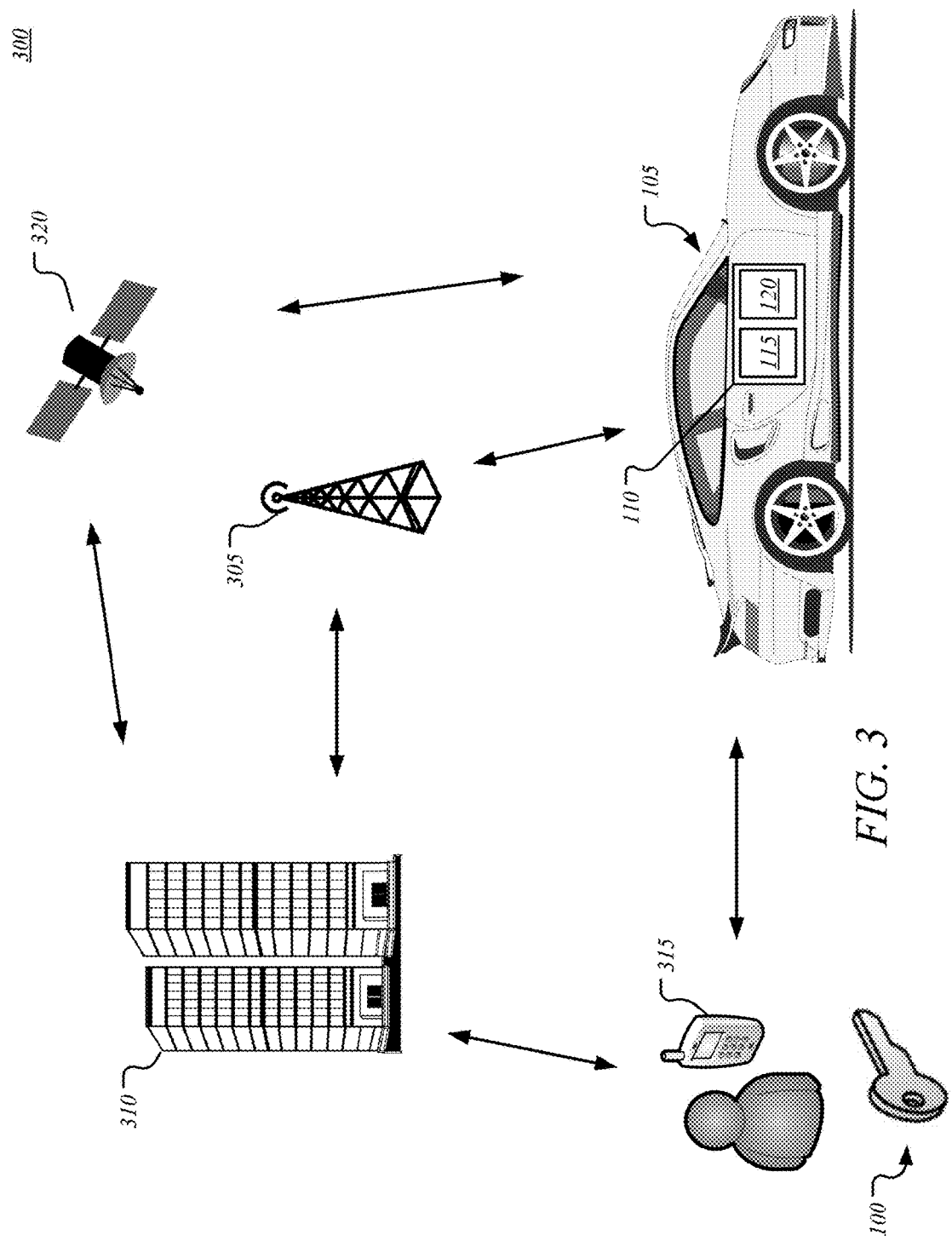
FIG. 3 is an illustration of a relay attack warning and prevention apparatus according to one or more aspects of the disclosed subject matter.

In order to prevent these types of attacks, a warning system can be implemented to warn the victim and use feedback from the victim to initiate recovery of the vehicle 105 in the event of its theft. As illustrated in FIG. 3, an apparatus 300 for notification of theft of a vehicle 105 includes the key fob 100, the vehicle 105, the NAD 110, a cloud network 305, a support center 310, and a mobile device 315 that includes a transceiver configured to receive and transmit data to the support center 310 and NAD 110.

Figure 4:
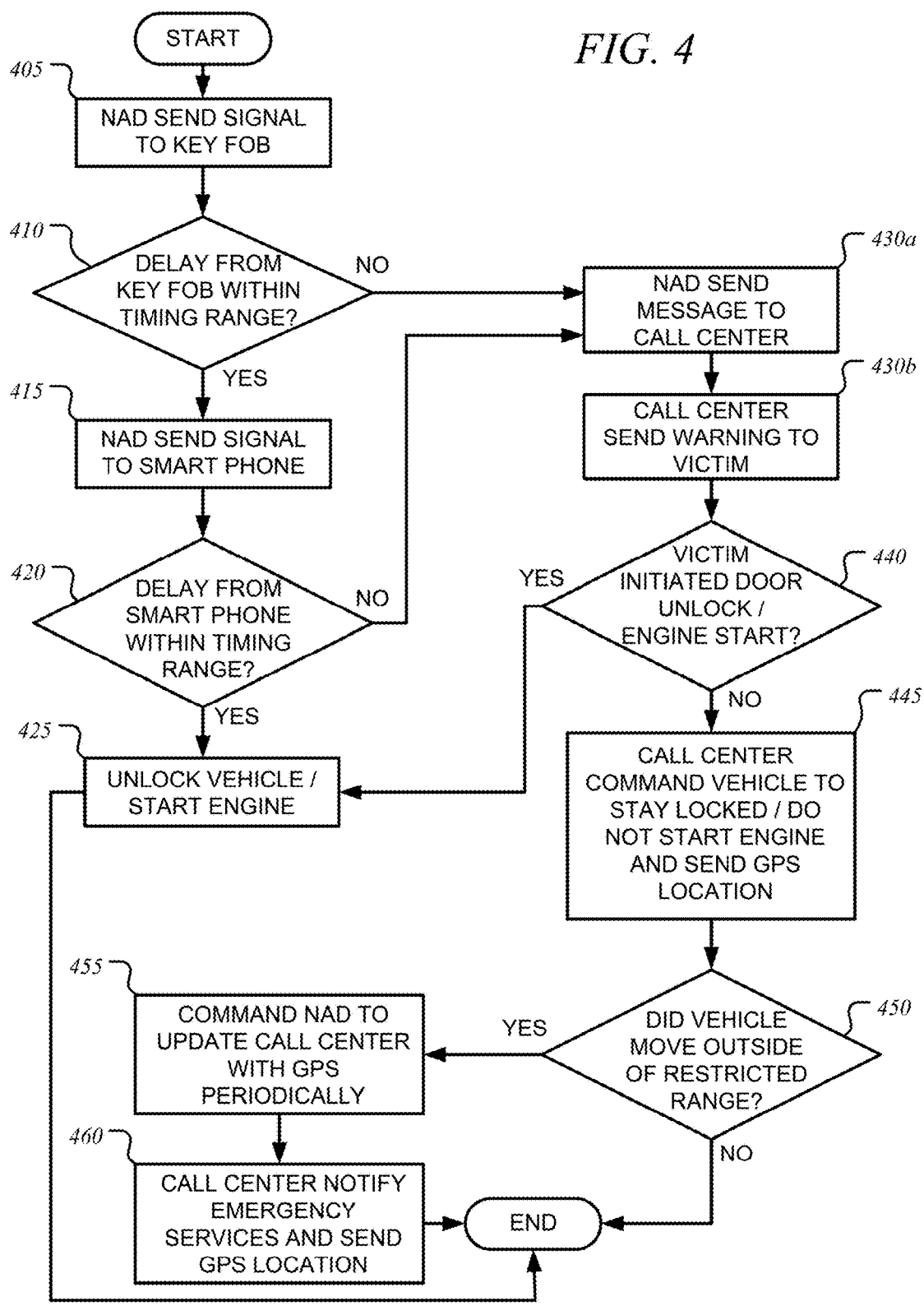
FIG. 4 is an algorithmic flow chart for the method of warning and preventing a relay attack according to one or more aspects of the disclosed subject matter.

In an exemplary embodiment, the key fob 100 and mobile device 315 communicate with the NAD 110 to determine if the key fob 100 and mobile device 315 are within a predetermined maximum range of the NAD 110 via a two-step verification. As illustrated in FIG. 4, one method of implementation is shown.

It begins with authenticating the key fob 100 and determining the distance from the key fob 100 to the vehicle 105. At step 405, the key fob 100 can receive a signal from the NAD 110 and transmit a reply signal to the NAD 110. Based on the delay time of the transmitted signal from the key fob 100 back to the NAD 110, the NAD 110 can determine if the key fob 110 is within a certain range at step 410. The proximity of the key fob 100 to the NAD 110 can be determined using a measured received signal strength indicator or time of flight. If the key fob 100 is determined not to be within a predetermined range, a warning is automatically transmitted from the NAD to the mobile device 315 in the form of a text message or a voice call via the call center 310 at steps 430*a* and 430*b*. The warning can alert the victim to the unauthorized request and prompt the victim to allow or stop the command from executing at step 440.

In another verification step, the NAD 110 can communicate with the mobile device 315 to determine the proximity of the victim to the vehicle 105 at step 415. The mobile device 315 can be configured to wirelessly communicate with the NAD 110. First, the NAD 110 can determine if the mobile device 315 is within a predetermined range of the NAD 110. The proximity of the mobile device 315 to the NAD 110 can be determined using a measured received signal strength indicator or time of flight at step 420. Second, if the mobile device 315 is not within range and a door unlock or an ignition start command has been requested, the NAD 110 can send a warning to the mobile device 315 in the form of a text message or a voice call via the call center 310 at steps 430*a* and 430*b*. The warning can alert the victim to the unauthorized request and prompt the victim to allow or stop the command from executing.

When both steps 410, 420 of authentication are passed, the vehicle will proceed to step 425 and unlock or start the engine. In the event of a warning sent to the mobile device 315 (whether correctly or mistakenly), the victim can approve of the unlock or start engine request at step 440, and the vehicle will proceed to step 425. If the victim rejects the request, the call center 310 can command the vehicle 105 to remain locked or not allow the engine to start at step 445.

The replies from the victim can be sent from the mobile device 315 to the NAD 110 via the call center 310. The transmissions can be sent through the call center 310 via the cloud network 305 or the satellite network 320. The cloud network 305 can be a wireless ad hoc network, Wi-Fi, or a cellular network that includes a plurality of cell towers. The satellite network 320 can include one or more satellites and one or more ground stations, wherein the ground stations are configured to wirelessly communicate with the call center 310 and NAD 110, and wherein the ground stations are configured to transmit to and receive data from the satellites. The call center 310 can include computerized auto-dialers with a pre-recorded message or live consultants, both of which can receive a reply from the mobile device 315 and take respective action to lock or unlock the vehicle 105, or start the engine.

When unauthorized access to the vehicle 105 has been obtained or the ignition has started, the call center 310 can also monitor the vehicle 105 location via the GPS module in the NAD 110 at step 445. If the vehicle's 105 location has moved outside of a predetermined range at step 450, the call center 310 can send a warning to the victim and alert the victim to the unauthorized movement of the vehicle 105. The GPS information can be transmitted to the call center 310 via the cloud network 305 or satellite network 320 in order to periodically update the vehicle's 105 location at step 455. The warning can prompt the victim to allow the call center 310 to notify emergency services to locate the vehicle 105 and repossess it if stolen at step 460.

The advantages of this system include a two-step verification process to unlock a vehicle 105 or start its ignition wherein signal delay is additionally used to determine the proximity of the authorized device to the vehicle 105. Upon failure of authentication at either of the two steps, a warning message is immediately sent to a victim's mobile device 315 and employs feedback from the victim to secure the vehicle 105.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosure. The accompanying claims and their equivalents are intended to cover such forms or modifications as would fall within the scope and spirit of the present disclosure.

What is claimed is:

1. A method of authentication for a vehicle equipped with a passive keyless entry and start (PKES) system that includes a network access device (NAD) configured to communicate with a key fob and a mobile device, comprising:
   sending a request for unlock or ignition start from the key fob to the NAD;
   sending a first challenge signal from the NAD to the key fob;
   determining if the key fob is within range of the NAD based on the first challenge;
   sending a second challenge signal from the NAD to the mobile device;
   determining if the mobile device is within range of the NAD based on the second challenge; and
   sending a warning to the mobile device when at least the mobile device is not within range of the NAD.

2. The method of claim 1, wherein sending the first challenge signal includes receiving a reply from the key fob with identification information in order to validate the key fob identity.

3. The method of claim 1, wherein sending the second challenge signal includes receiving a reply from the mobile device with identification information in order to validate the mobile device identity.

4. The method of claim 1, wherein determining if the key fob is within range includes calculating a distance between the key fob and NAD based on a delay time of the response.

5. The method of claim 1, wherein determining if the key fob is within range includes calculating a distance between the key fob and NAD based on a received signal strength indicator.

6. The method of claim 1, wherein determining if the mobile device is within range includes calculating a distance between the mobile device and NAD based on a delay time of the response.

7. The method of claim 1, wherein determining if the mobile device is within range includes calculating a distance between the mobile device and NAD based on a received signal strength indicator.

8. The method of claim 1, wherein the NAD includes a transceiver and sending the warning includes the NAD communicating with a call center via a cloud network or satellite network to notify an authorized vehicle owner on the mobile device.

9. The method of claim 8, wherein the satellite network includes at least one satellite and at least one ground station, wherein the at least one ground station is configured to wirelessly transmit to and receive data from the at least one satellite.

10. The method of claim 8, wherein the authorized vehicle owner uses the mobile device to transmit a reply to the call center warning.

11. The method of claim 8, wherein the call center can prevent the vehicle from unlocking or the engine from starting.

12. The method of claim 8, wherein the NAD includes a GPS module and the NAD periodically sends the GPS location of the vehicle to the call center.

13. The method of claim 12, wherein the call center communicates with emergency services to locate the vehicle when the GPS location of the vehicle moves outside a predetermined range.

14. An apparatus for notification of theft of a vehicle, the apparatus comprising:
circuitry configured to:
receive a request from a key fob for unlock or ignition start of the vehicle;
transmit a first challenge signal to the key fob in response to the request;
receive a response from the key fob based on the first challenge signal;
determine if the key fob is within range of the vehicle based on a response to the first challenge signal from the key fob;
transmit a second challenge signal to a mobile device;
receive a response from the mobile device based on the second challenge signal;
determine if the mobile device is within range of the vehicle based on a response to the second challenge signal from the mobile device; and
transmit a warning to the mobile device when at least the mobile device is not within range of the vehicle.

* * * * *